(12) United States Patent
Bement et al.

(10) Patent No.: US 6,954,326 B2
(45) Date of Patent: Oct. 11, 2005

(54) DYNAMICALLY IMPROVING DATA STORAGE DEVICE PERFORMANCE

(75) Inventors: Gary E. Bement, Frederick, CO (US); Michael D. Mundt, Longmont, CO (US); Mark A. Chapin, Louisville, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 338 days.

(21) Appl. No.: 10/256,351

(22) Filed: Sep. 26, 2002

(65) Prior Publication Data

US 2003/0218818 A1 Nov. 27, 2003

Related U.S. Application Data

(60) Provisional application No. 60/383,037, filed on May 23, 2002.

(51) Int. Cl.[7] ................................................. G11B 5/60
(52) U.S. Cl. .............................. 360/75; 360/69; 706/13
(58) Field of Search ........................... 360/69, 31, 53, 360/71, 75; 700/47; 706/12, 13, 14; 713/100

(56) References Cited

U.S. PATENT DOCUMENTS

| | | | | |
|---|---|---|---|---|
| 5,481,649 A | * | 1/1996 | Birdwell et al. ............... | 706/12 |
| 5,781,699 A | * | 7/1998 | Dittmar et al. ................ | 706/13 |
| 6,078,453 A | * | 6/2000 | Dziallo et al. ................. | 360/55 |
| 6,088,690 A | * | 7/2000 | Gounares et al. .............. | 706/13 |
| 6,144,951 A | * | 11/2000 | Dittmar et al. ................ | 706/13 |
| 6,282,527 B1 | * | 8/2001 | Gounares et al. .............. | 706/13 |
| 6,404,570 B1 | * | 6/2002 | McNeil et al. ................. | 360/31 |
| 6,499,022 B1 | * | 12/2002 | Dittmar et al. ................ | 706/13 |
| 6,516,309 B1 | * | 2/2003 | Eberhart et al. ............... | 706/27 |
| 6,704,687 B2 | * | 3/2004 | Turicchi et al. .............. | 713/100 |
| 6,728,690 B1 | * | 4/2004 | Meek et al. .................... | 706/12 |
| 6,766,497 B2 | * | 7/2004 | Anderson ....................... | 716/2 |
| 6,791,799 B2 | * | 9/2004 | Fletcher ....................... | 360/255 |
| 6,795,790 B1 | * | 9/2004 | Lang et al. .................... | 702/123 |
| 2002/0032832 A1 | * | 3/2002 | Dykes et al. .................. | 711/112 |

FOREIGN PATENT DOCUMENTS

JP    11272638 A    * 10/1999

OTHER PUBLICATIONS

Darrell Whitley, "A Genetic Algorithm Tutorial," Computer Science Dept., Colorado State University, Fort Collins, CO 80523, pp. 1–37, publication date unkown.

* cited by examiner

Primary Examiner—David Hudspeth
Assistant Examiner—James L Habermehl
(74) Attorney, Agent, or Firm—Shumaker & Sieffert PA.

(57) ABSTRACT

A method and system for improving performance in a disc drive using a genetic algorithm. Chromosomes of parameter settings are loaded into disc drive components and one or more metrics are monitored that respond to variations in the parameter settings. A fitness for each chromosome is obtained as a function of the one or more metrics. The chromosomes of settings are mated and adapted over time based on the fitness of each chromosome. Parameters within each chromosome vary by random selection based on the fitness of the chromosome.

20 Claims, 7 Drawing Sheets

FIG. 7

DYNAMICALLY IMPROVING DATA STORAGE DEVICE PERFORMANCE

RELATED APPLICATIONS

This application claims priority of U.S. provisional application Ser. No. 60/383,037, filed May 23, 2002.

FIELD OF THE INVENTION

This application relates generally to data storage devices and more particularly to dynamically improving data storage device performance.

BACKGROUND OF THE INVENTION

In a typical disc drive, numerous components work together to read and write data from and to discs in the drive. The components typically have interdependent settings or specifications selected to achieve a desired level of performance. For example, filters in the servo system of a disc drive typically have cutoff frequencies to filter out unwanted frequencies, such as aliases. Component settings are typically set when the disc drive is designed and/or manufactured, but are usually not changed subsequently. Additionally, component settings are typically selected independently of each other, without consideration of interdependence among components within the disc drive.

One problem with current approaches to disc drive design and manufacture relates to changes in disc drive environment after the disc drive is designed or manufactured. Typically, after the disc drive is put into use, component settings are not changed. The manufacturers assume a type of environment and select component settings that are believed to yield optimal performance for the assumed environment. In actuality, the assumed environment often differs substantially from the actual operating environment. For example, the disc drive may be used at a significantly different altitude than was assumed, or at a different temperature, or be exposed to different vibrations than assumed. To the extent that the actual environment differs from the assumed environment, the selected component parameters will not yield optimal disc drive performance.

Another problem with current approaches to disc drive design relates to interdependence among components in the disc drive. As discussed earlier, selection of one component parameter often affects behavior related to another component parameter. It is the combination of parameters that dictate the level of performance of a disc drive. However, parameters are often selected independently of other parameters during design and manufacture, without consideration of how their selection will impact behaviors of other components, and hence, the overall performance of the disc drive.

A particular example that illustrates common performance problems relates to areal density and fly height control. Disc drives usually have a transducer that flies over the surface of a disc, reading and/or writing date from and to the disc. Areal density refers to an amount of data per unit area on the disc surface. Fly height refers to the distance the transducer is from the surface of the disc. Generally, as fly height decreases (i.e., transducer closer to the surface), areal density increases because when the transducer is closer to the disc surface, data reading and writing is generally more accurate and data can be spaced more closely.

Based on required areal density, a transducer fly height is targeted, and an air bearing is designed that will allow the transducer to fly at the specified height. If this is done correctly, then the areal density requirement is met. However great attention must be paid to the variability imparted during the manufacturing process. Parts that fly too low will be at risk for contacting the disc and thereby possibly causing a failing drive. Parts that fly too high will not allow the drive to meet the areal density requirement. A fly height is typically targeted once when the disc drive is manufactured to correspond to a targeted reliability and areal density. However, after the disc drive is delivered to a user, conditions, such as altitude, may change such that the previously targeted reliability and areal density are no longer met.

Accordingly there is a need for a system and method for improving disc drive performance with consideration to component interdependence and component variation over the life of the disc drive.

SUMMARY OF THE INVENTION

Against this backdrop embodiments of the present invention have been developed. An embodiment of the present invention dynamically evaluates performance of a disc drive and adjusts parameter settings to improve performance. Thus, even after the disc drive is manufactured, the disc drive can adapt to changes in environment to improve performance. Additionally, disc drive fitness is based on interdependent parameters and component interrelationships are accounted for in parameter variation.

One embodiment includes a method of improving performance in a disc drive by generating a plurality of chromosomes having a plurality of parameter values associated with one or more component settings, selecting one of the chromosomes for analysis, applying each of the parameter values of the selected chromosome to the associated components, measuring one or more metrics of the disc drive, obtaining a fitness based on the one or more metrics, associating the fitness with the chromosome of applied parameter values, and evolving the chromosomes of parameter values based on the fitness. The method may further involve repeating the steps for all of the plurality of chromosomes to generate a fitness associated with each of the chromosomes as well as an accumulated fitness.

Still further, the method may involve applying each of the parameter values of the selected chromosome to the associated component during an idle mode of the disc drive. Further still, the method may involve selecting one of the plurality of chromosomes of parameter values to use during an active mode of the disc drive based on the fitness of the chromosome, and applying the one of the plurality of chromosomes selected to the disc drive in the active mode.

Another embodiment includes a disc drive having a disc for storing digital data, an actuator assembly rotatably mounted adjacent the disc for guiding a transducer head over a surface of the disc to read digital data from and write digital data to the disc, one or more components communicating with the actuator assembly for directing the actuator assembly to perform the reading and writing of digital data, wherein the components have settings for achieving the directing, and means for adapting the settings of the components to achieve a desired performance. The means for adapting may include memory storing chromosomes of parameter values corresponding to one or more of the settings, and an adaptation module coupled to the memory and the one or more components operable to perform an adaptation algorithm for improving actual performance of the disc drive until the actual performance converges with the desired performance.

The adaptation algorithm may include steps of applying the one or more settings to the one or more components, measuring metrics corresponding to the actual performance, generating a total fitness representative of the actual performance, and comparing the total fitness to a threshold fitness representative of the desired performance.

These and various other features as well as advantages that characterize the present invention will be apparent from a reading of the following detailed description and a review of the associated drawings.

DETAILED DESCRIPTION

In general, embodiments of the present invention are systems and methods of adaptively improving performance of a disc drive. More specifically, the systems and methods employ a genetic algorithm to evolve a set of chromosomes having parameters related to disc drive settings that stimulate associated responses in the disc drive. Still more specifically, the methods and systems calculate a fitness value associated with each chromosome and identify the optimal fitness value during an idle mode of operation. Settings of the chromosome associated with the optimal fitness value are then applied to corresponding disc drive components prior to, or during, an active mode of operation.

Figure 1:
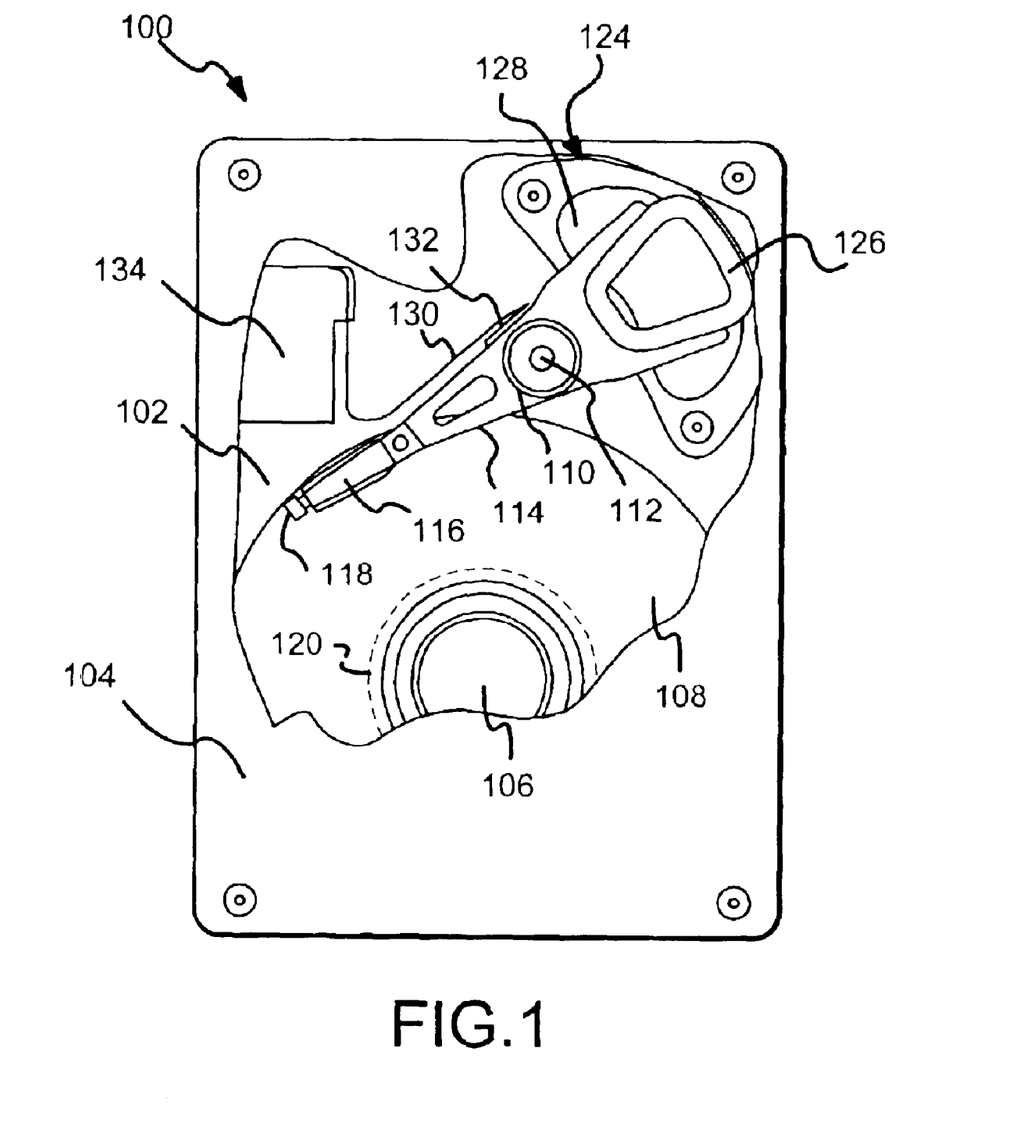
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

In a particular embodiment, the fly height is dynamic. The fly height refers generally to the average distance between a surface (e.g., top or bottom) of the disc 108 and a point on the head 118. The fly height may be made dynamically adjustable using one or more mechanisms. By way of example, and not limitation, the fly height may be made dynamically adjustable using a piezoelectric crystal mounted near the head 118, whereby current applied to the crystal causes the crystal to change shape and move the head 118 up or down. Other mechanisms that are known in the art may be used to dynamically adjust the fly height of the head 118.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
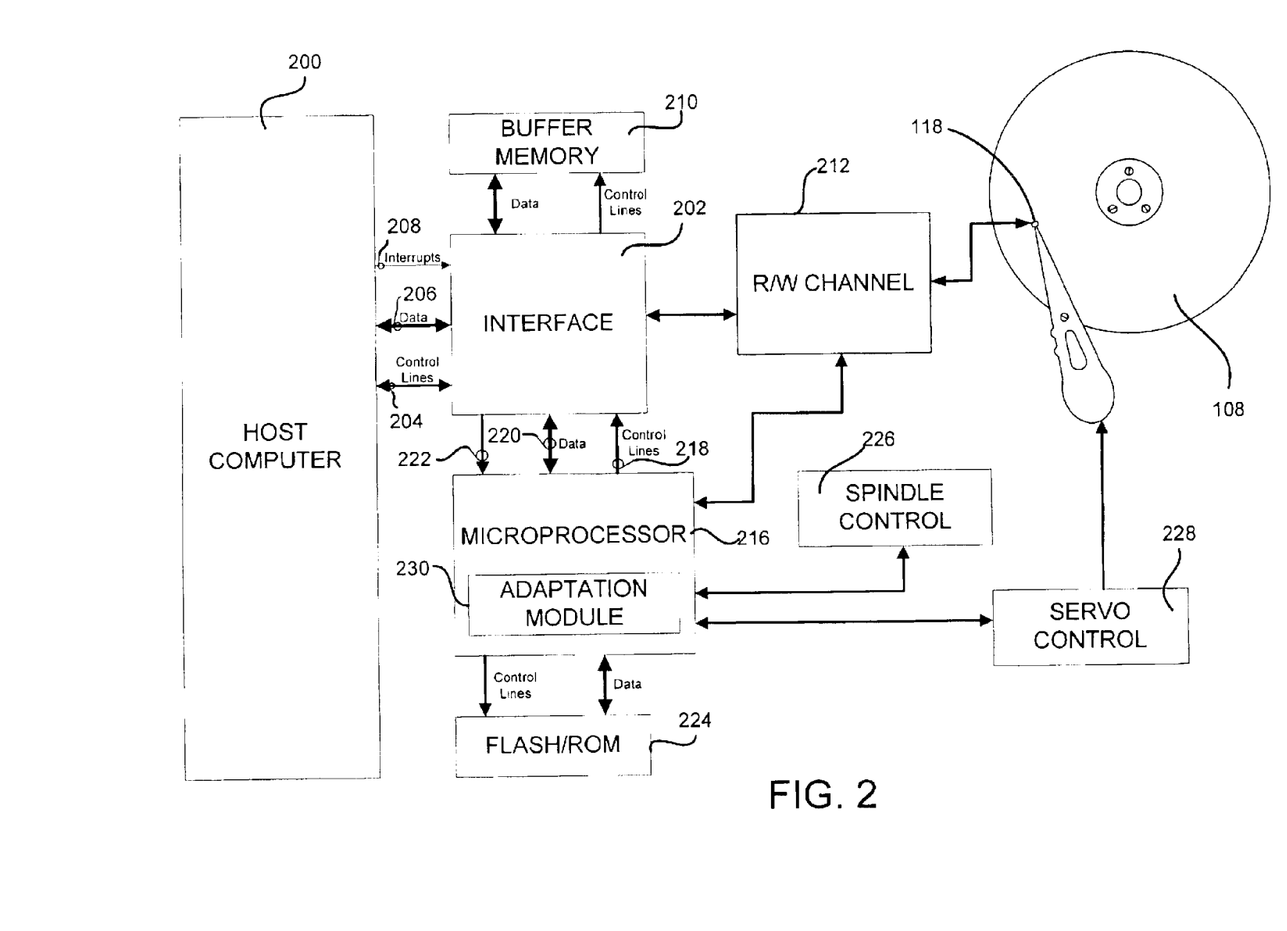
FIG. 2 is a functional block diagram of the disc drive of FIG. 1 in accordance with an embodiment of the present invention.

Referring now to FIG. 2, shown therein is a functional block diagram of the disc drive 100 of FIG. 1, generally showing the main functional circuits which are typically resident on a disc drive printed circuit board and which are used to control the operation of the disc drive 100. As shown in FIG. 2, the host 200 is operably connected to an interface application specific integrated circuit (interface) 202 via control lines 204, data lines 206, and interrupt lines 208. The interface 202 typically includes an associated buffer 210, which facilitates high speed data transfer between the host 200 and the disc drive 100. Data to be written to the disc drive 100 are passed from the host to the interface 202 and then to a read/write channel 212, which encodes and serializes the data.

The read/write channel 212 also provides the requisite write current signals to the heads 214. To retrieve data that has been previously stored by the disc drive 100, read signals are generated by the heads 214 and provided to the read/write channel 212, which processes and outputs the retrieved data to the interface 202 for subsequent transfer to the host 100. Such operations of the disc drive 100 are well known in the art and are discussed, for example, in U.S. Pat. No. 5,276,662 issued Jan. 4, 1994 to Shaver et al.

As also shown in FIG. 2, a microprocessor 216 is operably connected to the interface 202 via control lines 218, data lines 220, and interrupt lines 222. The microprocessor 216 provides top level communication and control for the disc drive 100 in conjunction with programming for the microprocessor 216 which is typically stored in a microprocessor memory (MEM) 224. The MEM 224 can include random access memory (RAM), read only memory (ROM) and other sources of resident memory for the microprocessor 216. Additionally, the microprocessor 216 provides control signals for spindle control 226, and servo control 228.

In one embodiment, the microprocessor 216 executes computer-readable code that implements an adaptive algorithm 230. The adaptive algorithm 230 evaluates the performance of the disc drive 100 and may responsively update settings of components in the disc drive 100 to improve performance. While the adaptive algorithm 230 is depicted as being implemented in computer-executable software in FIG. 2, it is to be understood that the adaptive algorithm 230 may be implemented in any combination of hardware, software, or firmware. An embodiment of the adaptive algorithm 230 is discussed in detail below. Generally, the process of adaptation (to changes in the environment, and the like) is carried out in an idle mode and an active mode.

The disc drive 100 executes commands issued to it from the host 200. When the disc drive 100 is processing or executing a command from the host 200, the disc drive 100 is in an active mode. Exemplary commands that may be issued to the disc drive 100 from the host 200 are read and write. While executing a typical read or write command, the disc drive performs one or more seek operations to locate a physical address on the disc 108 and read or write the associated data from or to the address. Other operations often occur during execution of read or write commands. By way of example, and not limitation, when a write command is issued to the disc drive 100, the data to be written is cached prior to actually writing the data to a location on the disc 108.

When the disc drive 100 is not in active mode, the disc drive 100 is in an idle mode. In one particular embodiment, the disc drive 100 executes a genetic algorithm (discussed below) in the idle mode in order to adaptively improve disc drive 100 performance. Using the genetic algorithm, the disc drive 100 is able to determine values for settings, such as, but not limited to, filter cut-off values, servo parameters, read/write channel parameters, and seek settle time, that yield an improved response. As is discussed below, the response to applied settings may be characterized by a fitness value, which may be determined from metrics. Settings corresponding to an optimal fitness value may be used during the active mode to improve performance.

Figure 3:
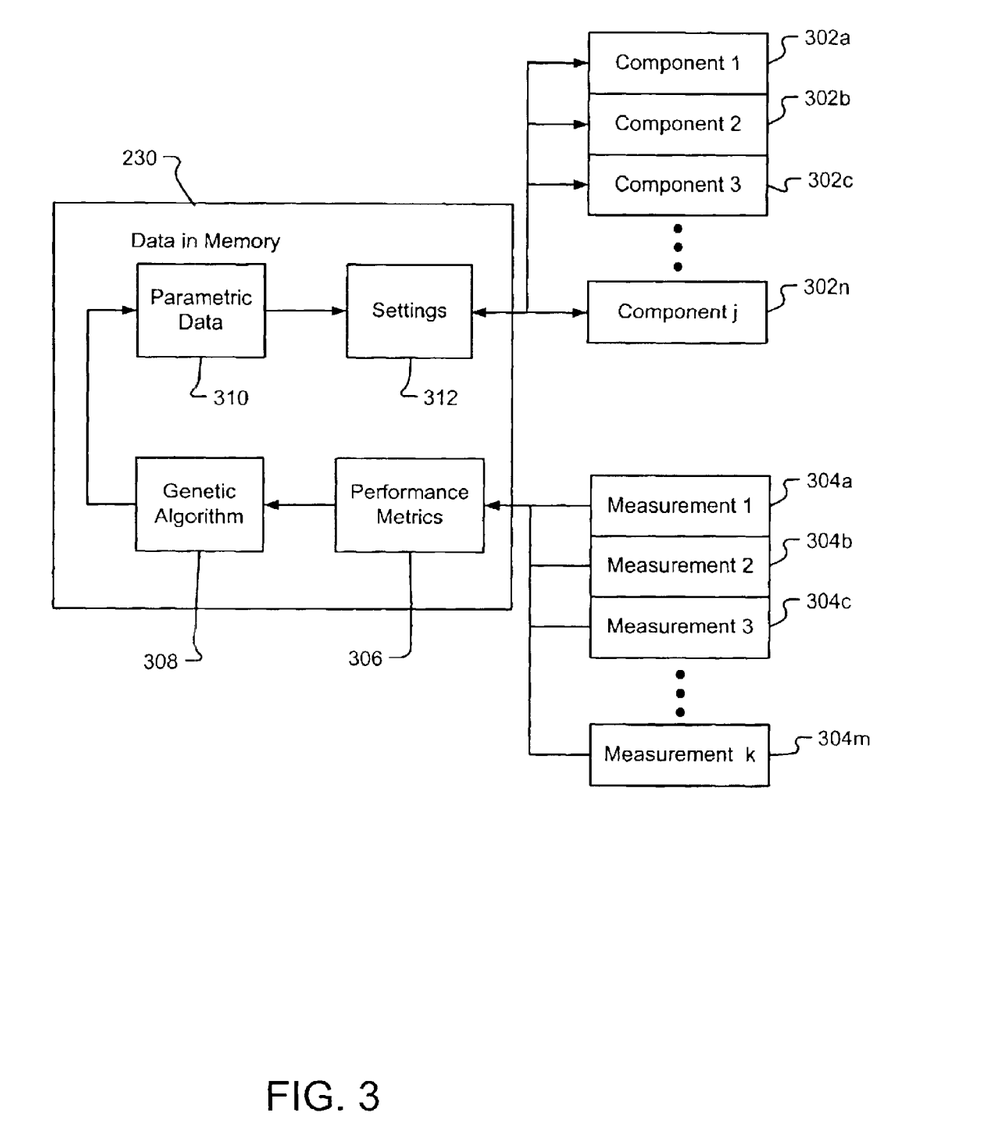
FIG. 3 is a functional block diagram of the adaptation module of FIG. 2 in operable communication with a number of disc drive components and measurements in accordance with one embodiment of the present invention.

FIG. 3 is a functional block diagram of the adaptation module 230 of FIG. 2 in accordance with one embodiment of the present invention. As shown in FIG. 3, the adaptation module 230 is in operable communication with a number of disc drive components 302a–302n and related measurements 304a–304m. The ellipsis shown between components 302c and 302n indicate that any number of components may be in operable communication with the adaptation module 230. Likewise, the ellipsis shown between measurements 304c and 304m indicate that any number of measurements may be used by the adaptation module 230.

The disc drive components 302a–302n refer to any adjustable component setting in the disc drive 100. The components 302a–302n may include, in any combination, software, hardware, or firmware settings. By way of example, and not limitation, the component 302a may refer to a filter cut-off frequency in the servo controller of the disc drive 100. As another example, the component 302b may refer to an adjustable fly height. The components 302a–302n may be set to any number of settings by the adaptation module 230. The adaptation module 230 may change component 302a–302n settings in any combination. In response to changing settings among the components 302a–302n, the disc drive response may change.

The response of the disc drive is characterized by various measurements 304a–304m that can be detected. The measurements 304a–304m refer to any measurable value in the disc drive, and preferably relate to one or more performance metrics. By way of example, and not limitation, the measurement 304a may be a seek settle time. By way of further example, and not limitation, one of the measurements 302a–304m may be a Bit Error Rate (BER). The measurements 304a–304m may be a metric directly measured from the disc drive, or the measurements 304a–304m may be a metric that represents a transformation applied to one or more direct measurements. For example, the BER measurement may be calculated based on a number of measurements.

In a preferred embodiment, at least one of the measurements 304a–304m indicates some aspect of mechanical performance and at least one of the measurements 304a–304m indicates some aspect of electrical and/or magnetic performance. A measurement that indicates mechanical performance is referred to as a tribological measurement or tribological metric. Tribological metrics include, but are not limited to, the number of read/write retries, thermal asperity occurrences, position error signal, and seek settle times. Electrical metrics include, but are not limited to, BER, Pulse-Width 50 (PW50), and harmonic ratio. Those skilled in the art will readily recognize many other electrical and tribological metrics that may be used by the adaptation module 230 to adaptively improve disc drive performance.

In general, the adaptation module 230 adjusts settings related to the components 302a–302j, obtains the measurements 304a–304m, and adapts a set of chromosomes to improve performance. The adaptation module 230 includes a performance metrics module 306, a genetic algorithm 308, chromosomes 310, and a settings module 312. The various modules and data included in the adaptation module 230 can be software, hardware, firmware, or any combination thereof. The modules and data in the adaptation module 230 generally form a feedback loop that is operable to monitor disc drive response to adjustments in component settings, and adapt settings to improve performance.

The performance metrics module 306 receives the measurements 304a–304m and performs functions with the measurements 304a–304m to obtain a fitness of the disc drive. In one embodiment, the performance metrics module 306 calculates a weighted average of the measurements 304a–304m. In this embodiment, the performance metrics module 306 preferably normalizes the weighted measurements 304a–304m in order to maintain unit consistency and obtain a fitness that is within a predetermined range (e.g., 0–10, 10 being the best fitness). Equations (1)–(3) illustrates exemplary functions that may be applied to BER and seek settle time to yield a fitness value.

$$\text{fitness} = \max(10 - \text{BERPenalty} - \text{SettleTimePenalty}, 0) \quad (1)$$

$$\text{BERPenalty} = 10 + \log_{10}(\text{BER}) \quad (2)$$

$$\text{SettleTimePenalty} = \text{time(msec)} \quad (3)$$

In one embodiment, the fitness in equation (1) is limited in range to 0 and 10, wherein 10 represents a more optimal fitness and zero represents a less optimal fitness. The BER-Penalty is a value that represents a penalty associated with a higher bit error rate. A higher BER generally corresponds to a lower fitness because a higher BER results in a lower areal density. The SettleTimePenalty is a value that represents a length of time required to seek to a desired location on the disc. A higher seek settle time generally corresponds to a lower fitness because a higher seek settle time often implies mechanical latencies associated with seeking.

In one embodiment of the adaptation module, adjustments are made to various settings in the disc drive in response to a fitness value being outside a desired range of values. For example, in a particular implementation, the fitness may be tested to determine if the fitness is less than four. In response, the BERPenalty and SettleTimePenalty may be tested to determine if the source of sub-optimal fitness is an electrical metric (BERpenalty) or a mechanical metric (Settle TimePenalty). If the source of sub-optimal fitness is an electrical metric (BERPenalty), then the fly height of the transducer may be adjusted closer to the disc surface. If the source of the suboptimal fitness is a mechanical metric (e.g., SettleTimePenalty), the fly height may be adjusted farther from the surface of the disc. One way of adjusting fly height is by adjusting a preload setting near the end of the actuator arm. Numerous other types of adjustments may be made in response to a fitness value.

The equations (1)–(3) are for illustrative purposes only. It will be understood by those skilled in the art that other types of metrics may be used to yield a fitness value. In addition the metrics may be combined in many other ways to obtain the fitness value. The types of metrics and the way they are combined is dependent on the particular implementation and may also depend on the performance the manufacturer desires. It will also be understood that fly height is only one of many parameters in the disc drive that may be adjusted to improve performance.

The genetic algorithm 308 mates the chromosomes 310 based on the fitness determined by the performance metrics module 306. The genetic algorithm 308 receives a fitness value associated with a chromosome, and adjusts parameters in the chromosomes using a function of the fitness value. In one embodiment, the genetic algorithm 308 randomly chooses each parameter in the chromosome based on the fitness of the chromosomes. In this embodiment, chromosomes with a higher fitness are given a higher probability of survival than chromosomes with a lower fitness. In a particular embodiment, the genetic algorithm 308 utilizes a 'roulette wheel' random selection process for each value in the chromosomes 310. The genetic algorithm 308 updates the chromosomes 310.

Figure 4:
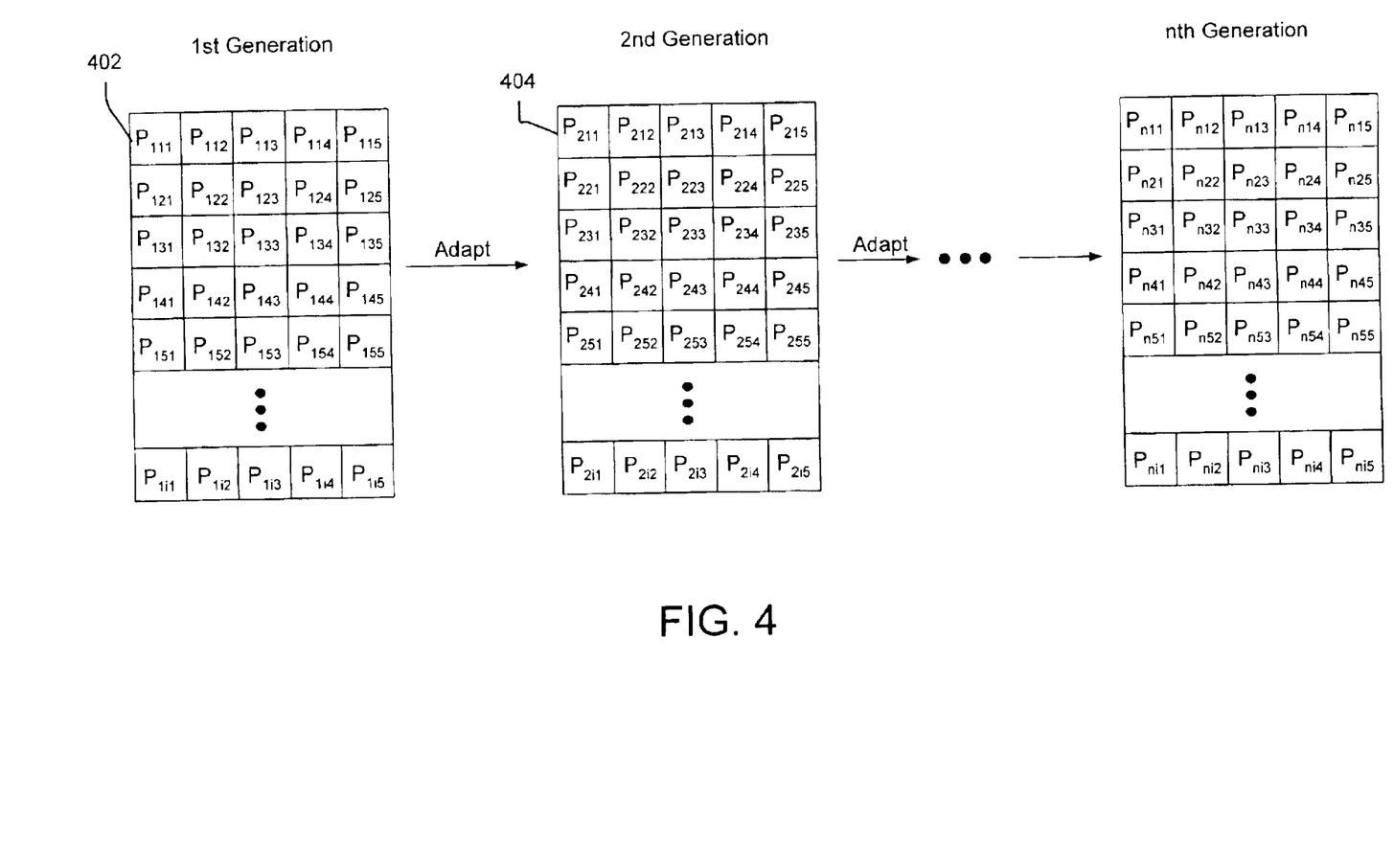
FIG. 4 illustrates generations of chromosomes having component setting parameters that may be used by the adaptation module of FIG. 2.

The chromosomes 310 are sets of parameters related to settings of the components 302a–302n. An exemplary embodiment of chromosomes is illustrated in FIG. 4. In one embodiment, the first generation of chromosomes 310 is set when the disc drive in manufactured. The first generation may be set using a random process or a deterministic process, wherein best guesses are used to set the initial chromosome parameters. The chromosomes are stored in memory in the disc drive. A number of generations of chromosomes is illustrated in FIG. 4. Generations are discussed in more detail below. In the exemplary embodiment shown in FIG. 4, there are a set of 'i' chromosomes in each generation. Each chromosome has 5 parameters (1–5) in the example. For example, in the first generation, the first chromosome 402 has parameters $P_{111}$–$P_{115}$. Similarly, in the second generation, the first chromosome 404 has parameters $P_{211}$–$P_{215}$. The parameters $P_{111}$–$P_{n15}$ are binary encoded values corresponding to one or more component settings.

The genetic algorithm 308 mates chromosomes in a prior generation based on fitness values associated with the chromosomes and updates the chromosomes 310 in the subsequent generation based on the mating. As an example, if, in the first generation, the first chromosome 402 has a higher fitness value that the other chromosomes in the first generation, the genetic algorithm selects parameters in each of the chromosomes in the second generation such that the first chromosome parameters are more likely to survive. In one embodiment, the genetic algorithm 308 employs a roulette wheel random selection algorithm wherein a level of probability is attributed to each of the chromosomes in a directly proportional relation to the level of fitness. Another way of assigning probabilities of survival is to add all fitness values of the chromosomes to generate an accumulated fitness for the generation (e.g., the first generation). Then, the fitness associated with each chromosome is divided by the accumulated fitness to obtain a probability (as a percentage of accumulated fitness) associated with the chromosome. Other methods of assigning survival probabilities to the parameter values, which are in accordance with other embodiments, will be readily envisioned by those skilled in the art.

To illustrate, in one embodiment the genetic algorithm 308 selects parameters $P_{211}$–$P_{215}$ by starting with $P_{211}$, moving to $P_{212}$, moving to $P_{213}$, and so on, selecting a value for each of the parameters in the second generation. For example, to select a value for $P_{211}$, the genetic algorithm selects one of the values $P_{111}$–$P_{1i1}$ from the first generation. In selecting one of $P_{111}$–$P_{1i1}$, the genetic algorithm may attribute probabilities to each of the values $P_{111}$–$P_{1i1}$ according to the level of fitness of the corresponding chromosome.

Figure 5:
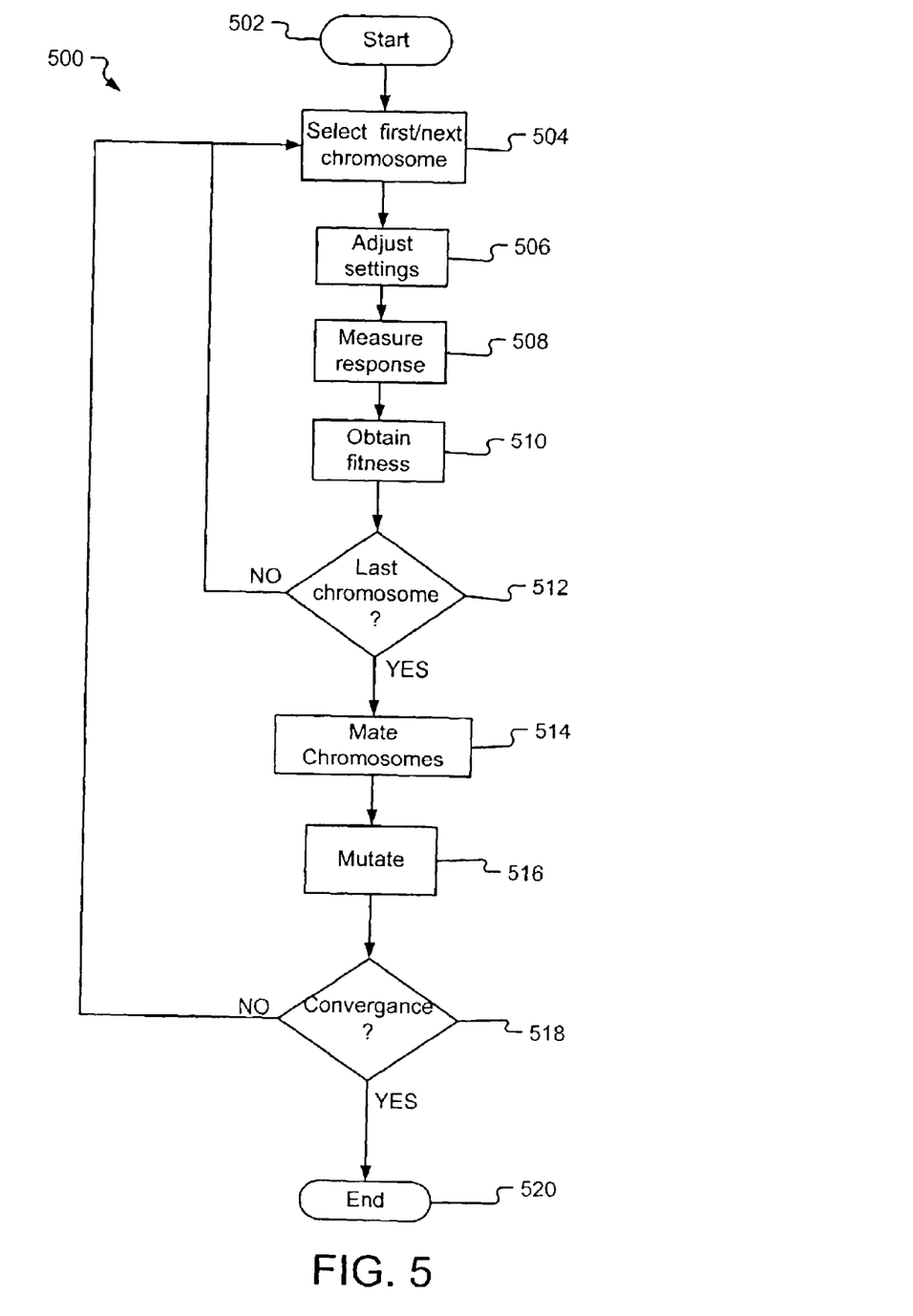
FIG. 5 is an operation flow diagram illustrating exemplary operations employed by the adaptation module of FIG. 2.

FIG. 5 is an adaptation operation 500 illustrating exemplary operations employed by the adaptation module of FIG. 2. After a start operation 502, control transfers to a selecting operation 504. The selecting operation 502 selects one of a plurality of chromosomes containing parameters related to component settings in the disc drive. Control then transfers to an adjusting operation 506 wherein the component settings are adjusted according to the parameters in the selected chromosome.

Control transfers to a measuring operation 508 wherein a disc drive response is measured. The disc drive response may be characterized by a number of metrics, including, but not limited to, tribological metrics, and electrical metrics. Then control transfers to an obtaining operation 510 in which a fitness value is obtained that corresponds to the selected chromosome. The fitness value reflects an overall fitness of the disc drive and is preferably a function of the metrics obtained in the measuring operation 508.

A query operation 512 determines whether all the chromosomes have been used. If more chromosomes remain in this generation, the query operation 512 branches 'NO' to the selecting operation 504. The selecting operation 504 then selects the next chromosome for analysis. If the query operation 512 determines that no more chromosomes remain for analysis in the current generation, the query operation 512 branches 'YES' to a mating operation 514. The mating operation 514 varies the parameters of the chromosomes based on the fitness associated with each chromosome.

In one embodiment, the mating operation 514 calculates probabilities associated with each of the chromosomes according to their associated fitness. In this embodiment, the mating operation 514 updates and/or generates each of the parameters in the next generation of chromosomes by randomly selecting among the corresponding parameters of the current generation. After the mating operation 514, control transfers to a mutate operation 516 wherein a random adjustment may be made to the chromosomes.

In a preferred embodiment of the mutate operation 516, a bitwise mutation of the parameter values is performed. In this particular embodiment, the adaptation module 230 iterates through each parameter value, and through each bit in each parameter value. Each bit may be changed with a predetermined likelihood. In a preferred embodiment, the probability that a bit will change is a very small probability, such as, less than $1/100^{th}$. During the mutation process in this embodiment, a random number generator generates a number between zero and one uniformly and a bit will be changed if the random number generated is less than $1/100^{th}$. Those skilled in the art will readily envision other embodiments of the mutation operation 516, which fall within the scope of the present invention.

The operations 504 through 516 may be executed any number of times. In one embodiment, the operations 504 through 516 are executed substantially continuously throughout the life of the disc drive. In this embodiment, the adaptation operation 500 may be performed on a substantially periodic basis. The adaptation operation 500 is preferably performed during an idle mode of the disc drive.

In another embodiment, a query operation 518 determines whether a desired level of performance has been achieved by the adaptation operation 500. The query operation 518 determines whether the actual performance of the disc drive has converged with the desired level of performance. The query operation 518 may check for a convergence by comparing a total level of fitness measured in the disc drive with a threshold level of fitness. The threshold level of fitness may be stored in memory when the disc drive is manufactured and the query operation 518 may compare the accumulated fitness with the stored threshold fitness value. Performance convergence will be met if the actual fitness is equal to the threshold fitness, within some tolerance (e.g. +/−10%).

If the actual performance of the disc drive has converged with the desired level of performance, the query operation 518 branches "YES" to an end operation 520. If the query operation 518 determines that convergence has not been met, the query operation 518 branches "NO" to the select operation 504, where the first chromosome is selected again for adaptation. The number of times that the adaptation algorithm is executed depends on the particular implementation. The convergence will be met more quickly when the chromosomes that are initially selected yield a higher level of performance. On the other hand, if the initially selected chromosomes yield a lower level of performance, the operations in the adaptation operation 500 will tend to be executed a greater number of times before convergence is achieved. During actual testing, when the initial parameter values were randomly selected, 10–50 iterations of the adaptation operation 500 were required before convergence was met. During other tests, when the initial parameters were selected that were close to the optimal solution, only 5–10 iterations of the adaptation module 500 were required to meet convergence. The adaptation operation 500 ends at the end operation 520.

Figure 6:
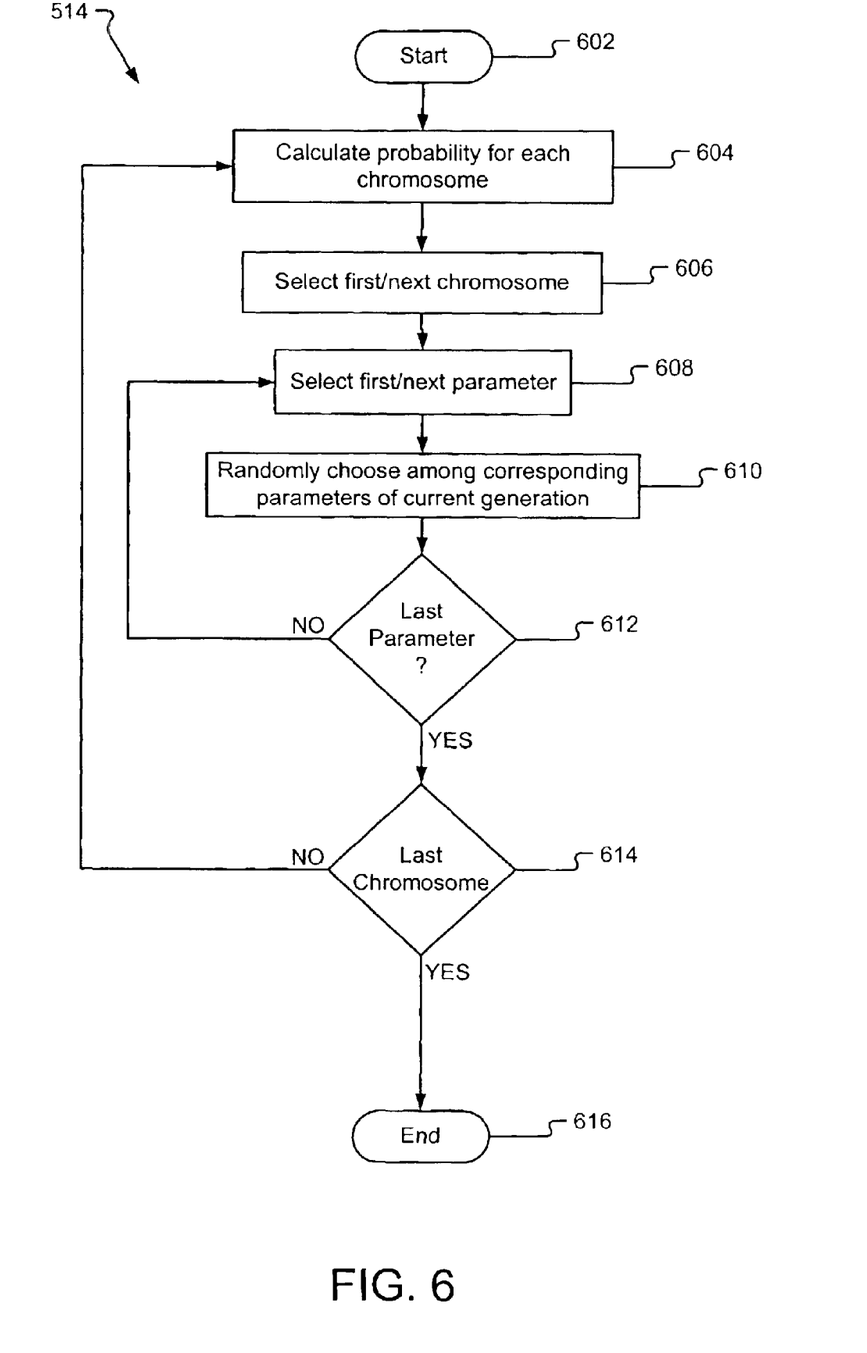
FIG. 6 is an operation flow diagram illustrating exemplary operations for chromosome mating employed by the adaptation module of FIG. 2.

FIG. 6 is an operation flow diagram illustrating exemplary operations in a chromosome mating operation 514 that may be employed by the adaptation module of FIG. 2. The particular embodiment of the mating operation 514 iterates through chromosomes in a next generation, updating chromosomes in the next generation with mated chromosomes from a current generation. After a start operation 602, a calculate operation 604 determines a probability associated with each chromosome in the current generation. The probability is based on a previously determined fitness value associated with the chromosome and will determine the likelihood of survival of the chromosome and/or parameters in the chromosome.

In one embodiment of the calculate operation 604, the probability of each chromosome is set equal to the chromosome's fitness divided by the sum of all fitness values for all the chromosomes. After the probabilities are calculated, control transfers to a selecting operation 606. The selecting operation 606 selects the first chromosome of the next generation to be updated. Control then transfers to another selecting operation 608, wherein the first parameter is selected from the selected chromosome of the next generation.

A choosing operation 610 performs a random selection process to choose among parameters in the current generation. The choosing operation 610 uses the probabilities that were determined in the calculating operation 604 to perform the random selection process. In one embodiment of the choosing operation 610, a random number generator is used to select among the parameters. Other methods of random selection as are known in the art may be used to choose a parameter. The choosing operation 610 updates the select parameter of the next generation with the parameter that was randomly chosen from the current generation.

A query operation 612 determines whether the selected parameter (selected in the selecting operation 608) is the last parameter of the selected chromosome (selected in the selecting operation 606). If the selected parameter is not the last parameter, the query operation 612 branches 'NO' to the selecting operation 608 where the next parameter is selected for update in the next generation. If the selected parameter is the last parameter, the query operation 612 branches 'YES' to another query operation 614.

The query operation 614 determines whether the last chromosome of next generation has been updated. If the last chromosome of the next generation has not been updated, the query operation 614 branches 'NO' to the selecting operation 604, wherein the next chromosome of the next generation is selected to be updated. If the last chromosome of the next generation has been updated, the query operation 614 branches 'YES' to an end operation 616 where the mating operation 514 ends. The particular operations described and illustrated in FIG. 6 are only examples of operations that may be used to mate chromosomes in an adaptive process. Many other different operations may be used without straying from the scope and spirit of the present invention.

Figure 7:
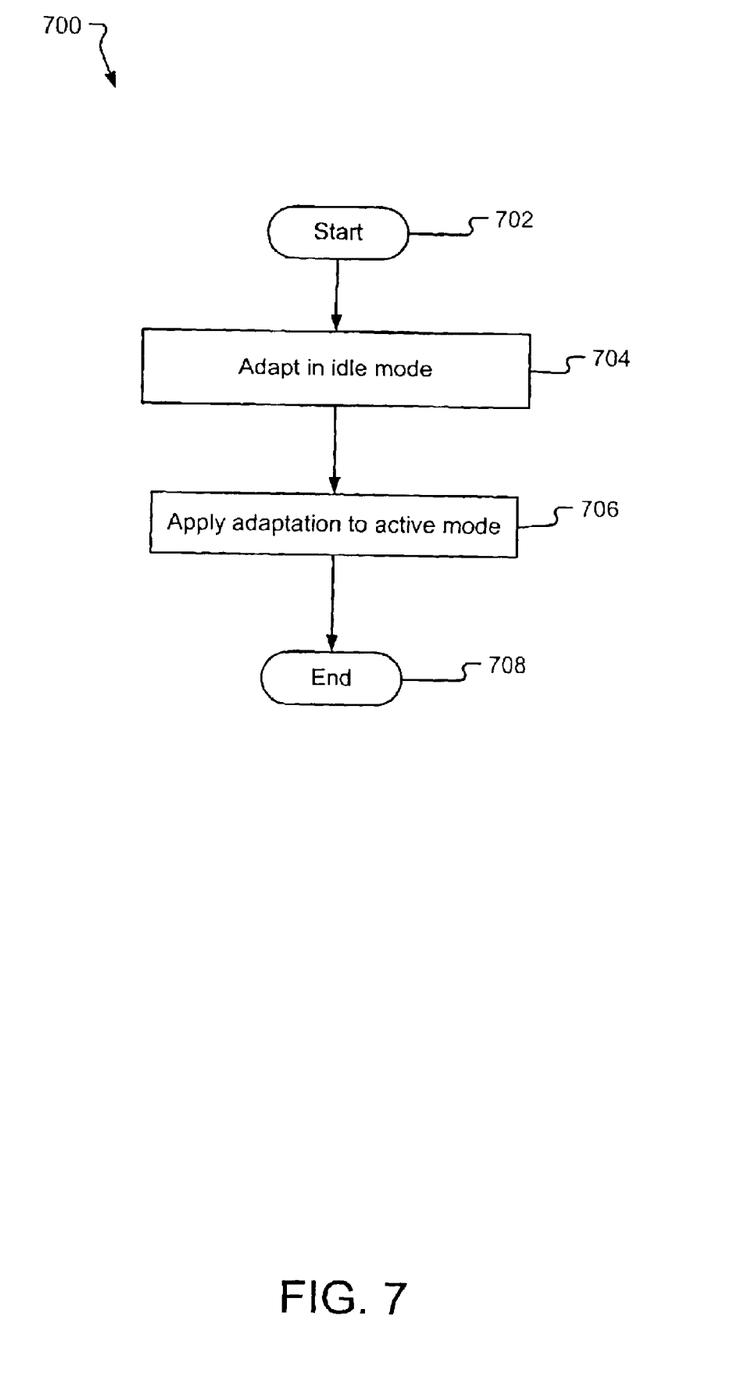
FIG. 7 is an operation flow diagram illustrating exemplary operations for setting adaptation in an idle disc drive mode and an active disc drive mode.

FIG. 7 is an operation flow diagram 700 illustrating exemplary steps for identifying component settings in an idle mode and applying optimal component settings in an active mode. After a start operation 702, an adapting operation 704 adapts chromosomes in an idle mode of the disc drive. An idle mode is any mode of operation wherein the disc drive is not busy executing commands from the host. An idle mode may be viewed as a background mode of operation. The idle mode of operation may be implemented using software threads, interrupt driven, or any other means as may be known in the art.

The adapting operation 704 preferably executes an adaptation algorithm, such as the algorithms illustrated in FIGS. 5 and 6. The adapting operation 704 mates chromosomes associated with component settings and thereby identifies optimal component settings that yield a desired level of performance. The adapting operation 704 may store the optimal chromosomes and/or the optimal settings in memory for use in an active mode of operation. After the adapting operation 704, control transfers to an applying operation 704, wherein optimal settings identified in the adapting operation are applied to components in an active mode of operation.

An active mode of operation generally includes any mode in which the disc drive is executing commands from the host computer, or commands that arise from commands generated from the host computer. For example, while executing a write command from the host computer, the disc drive would be in active mode. In addition, the disc drive would be considered in active mode when performing a 'write back' command that is associated with a write command, even though a host computer will generally not issue a 'write back' command.

The applying operation 704 preferably involves setting up components in the disc drive prior to executing commands from the host (or a command that arises from a command from the host). Generally, applying component settings involves writing data to the appropriate memory or component address locations, and/or setting the proper address and data lines in the disc drive, such that the proper components are set to the optimal settings. After the components are set up, the operation 700 ends and end operation 706. The operation 700 may execute the adapting operation 702 any number of times prior to executing the applying operation 704, depending on the particular implementation. For example, it may be reasonable to execute the adapting operation 702 ten or more times prior to applying the optimal settings to the disc drive in active mode.

In summary, an embodiment of the present invention may be viewed as a method of improving performance in a disc drive (such as 100) including generating (such as 514) chromosomes (such as FIG. 4) having parameter values (such as 402, 404) associated with one or more component settings (such as 302a–302n), selecting (such as 504) one of the chromosomes for analysis, applying (such as 506) each of the parameter values of the selected chromosome to the associated components (such as 302a–302n), measuring (such as 508) metrics of the disc drive, obtaining (such as 510) a fitness based on the one or more metrics, associating (such as 510) the fitness with the chromosome of the applied parameter values, and evolving (such as 514 and 516) the chromosomes of parameter values based on the fitness. The steps may be repeated (such as 512) for all of the chromosomes.

Another embodiment may involve applying (such as 702) each of the parameter values of the selected chromosome to the associated component during an idle mode of the disc drive. The embodiment may also involve selecting (such as 704) one of the chromosomes of parameter values to use during an active mode of the disc drive based on the fitness of the chromosome, and applying (such as 704) the selected chromosomes to the disc drive in the active mode.

Yet another embodiment may be viewed as a disc drive (such as 100) including a disc (such as 108) operable to store digital data, an actuator assembly (such as 110) rotatably mounted adjacent the disc to guide a transducer head (such as 118) over a surface of the disc for reading digital data from and writing digital data to the disc, components communicating with the actuator assembly (such as 110) to direct the actuator assembly to perform reading and writing of digital data, and a means (such as 230) for adapting settings of the components to achieve a desired performance.

The means for adapting the settings (such as 302a–302n) may include memory (such as 224 or 210) that stores chromosomes (such as FIG. 4) of parameter values (such as 402) corresponding to one or more settings (such as 302a–302n), and an adaptation module (such as 230) coupled to the memory and the components for performing an adaptation algorithm (such as 500) for improving actual performance of the disc drive (such as 100) iteratively until the actual performance converges with the desired performance. The adaptation algorithm (such as 500) may include applying (such as 500) the settings to the components, measuring (such as 508) metrics (such as 304a–304m) corresponding to the actual performance, generating (such as 514 or 516) a total fitness representative of the actual performance, and comparing (such as 518) the total fitness to a threshold fitness representative of the desired performance.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous changes may be made which will readily suggest themselves to those skilled in the art and which are encompassed in the spirit of the invention disclosed and as defined in the appended claims.

What is claimed is:

1. A method of improving performance in a data storage device comprising steps of:
    (a) generating a plurality of chromosomes, the chromosomes each having a plurality of parameter values, each parameter value associated with one or more component settings that determine a fly height of a transducer over a surface of a data storage medium;
    (b) selecting one of the chromosomes for analysis;
    (c) applying each of the parameter values of the selected chromosome to the associated components;
    (d) measuring one or more metrics of the data storage device;
    (e) obtaining a fitness based on the one or more metrics;
    (f) associating the fitness with the chromosome of applied parameter values; and
    (g) evolving the chromosomes of parameter values based on the fitness.

2. The method of claim 1 further comprising steps of:
    (h) repeating the steps (a) through (g) for all of the plurality of chromosomes to obtain a corresponding plurality of fitnesses.

3. The method of claim 2 wherein the applying step (c) comprises steps of:

(c)(1) applying each of the parameter values of the selected chromosome to the associated component during an idle mode of the data storage device.

4. The method of claim 3 further comprising steps of:

(i) selecting one of the plurality of chromosomes of parameter values to use during an active mode of the data storage device based on the fitness of the chromosome; and (j) applying the one of the plurality of chromosomes selected in the selecting step (i) to the data storage device in the active mode.

5. The method of claim 4 wherein the selecting step (i) comprises steps of:

(i)(1) identifying the chromosome of parameter values that has the optimal fitness.

6. The method of claim 2 wherein the evolving step (g) comprises steps of:

(g)(1) randomly selecting a surviving parameter value from a first chromosome in the plurality of chromosomes to move to a second chromosome in the plurality of the chromosomes; and (g)(2) replacing a corresponding parameter value in the second chromosome with the surviving parameter value.

7. The method of claim 6 wherein the randomly selecting step (g)(1) comprises steps of:

(g)(1)(i) determining a probability of survival associated with each chromosome; and (g)(1)(ii) randomly selecting the surviving parameter value based on the determined probabilities.

8. The method of claim 7 wherein the determining step comprises steps of:

(g)(1)(i)(1) summing all the fitness values to create an aggregated fitness value; and (g)(1)(i)(2) dividing each fitness value by the aggregated fitness value.

9. A disc drive comprising:

a disc operable to store digital data thereon;

an actuator assembly rotatably mounted adjacent the disc operable to guide a transducer head over a surface of the disc for reading digital data from and writing digital data to the disc;

one or more components directing a fly height of the transducer over a surface of the disc, the components having settings for achieving the directing; and means for adapting the settings of the components to achieve a desired performance.

10. The disc drive of claim 9 wherein the means for adapting the settings comprises:

memory storing chromosomes of parameter values corresponding to one or more of the settings; and an adaptation module coupled to the memory and the one or more components operable to perform an adaptation algorithm for improving actual performance of the disc drive until the actual performance converges with the desired performance.

11. The disc drive of claim 10 wherein the adaptation algorithm comprises:

applying the one or more settings to the one or more components;

measuring metrics corresponding to the actual performance;

generating a total fitness representative of the actual performance; and comparing the total fitness to a threshold fitness representative of the desired performance.

12. An apparatus, comprising:

a transducer configured to transfer data to and from a medium when a surface of the medium is separated from the transducer by a controllable distance and the surface of the medium is in motion relative to the transducer;

means for adjusting the controllable distance in response to a distance control signal; and a processor to receive data related to the performance of the transducer and to generate the distance control signal based on the received data.

13. The apparatus of claim 12, wherein the processor is further to repeatedly receive data related to the performance of the transducer and to generate the distance control signal based on the received data until the controllable distance converges on an optimal value.

14. The apparatus of claim 12, wherein the processor is configured to generate the distance control signal by determining an updated value according to a predetermined genetic algorithm.

15. The apparatus of claim 14, wherein the predetermined genetic algorithm comprises steps of:

(a) generating a plurality of chromosomes, the chromosomes each having a plurality of parameter values, each parameter value associated with one or more component settings that determine the controlled distance;

(b) selecting one of the chromosomes for analysis;

(c) applying each of the parameter values of the selected chromosome to the associated components;

(d) measuring one or more metrics of the data storage device;

(e) obtaining a fitness based on the one or more metrics;

(f) associating the fitness with the chromosome of applied parameter values; and (g) evolving the chromosomes of parameter values based on the fitness.

16. The apparatus of claim 12, wherein the received data comprises information associated with an error rate corresponding to data transferred between the transducer and the medium at the current distance control signal.

17. The apparatus of claim 16, wherein the received data further comprises information associated with a tribological measurement at the current distance control signal.

18. The apparatus of claim 12, wherein the motion of the medium comprises rotation of the medium about an axis.

19. A data storage device comprising the apparatus of claim 12.

20. The data storage device of claim 19, wherein processor is configured to repeatedly receive data related to the performance of the transducer and to generate the distance control signal based on the received data when the data storage device is in an idle mode of operation.

* * * * *